US012125418B2

(12) United States Patent
Perpetua

(10) Patent No.: US 12,125,418 B2
(45) Date of Patent: Oct. 22, 2024

(54) SIGN AND FABRICATION THEREOF

(71) Applicant: Devin Perpetua, Warwick, NY (US)

(72) Inventor: Devin Perpetua, Warwick, NY (US)

(73) Assignee: Fujifilm North America, Imaging Division, Morrisville, NC (US)

( * ) Notice: Subject to any disclaimer, the term of this patent is extended or adjusted under 35 U.S.C. 154(b) by 0 days.

(21) Appl. No.: 18/507,809

(22) Filed: Nov. 13, 2023

(65) Prior Publication Data

US 2024/0112604 A1 Apr. 4, 2024

Related U.S. Application Data

(62) Division of application No. 17/542,408, filed on Dec. 4, 2021, now Pat. No. 11,869,390.

(60) Provisional application No. 63/121,630, filed on Dec. 4, 2020.

(51) Int. Cl.

*G09F 7/18* (2006.01)
*B41J 3/28* (2006.01)
*B41J 11/58* (2006.01)
*G09F 7/00* (2006.01)

(52) U.S. Cl.

CPC *G09F 7/18* (2013.01); *B41J 3/28* (2013.01); *B41J 11/58* (2013.01); *G09F 7/002* (2013.01); *G09F 2007/1834* (2013.01)

(58) Field of Classification Search

CPC .... G09F 7/18; G09F 7/002; G09F 2007/1834; B41J 3/28; B41J 11/58

See application file for complete search history.

(56) References Cited

U.S. PATENT DOCUMENTS 2,333,302 A * 11/1943 Enk .......................... G09F 3/206 40/658
4,660,310 A * 4/1987 Farmer ............... G09F 15/0006 40/607.06
4,817,319 A * 4/1989 Vitale ..................... E01F 9/658 40/610
5,595,010 A 1/1997 Fuller et al.
5,937,555 A * 8/1999 Query ........................ G09F 7/00 40/610
6,073,378 A 6/2000 Gabbert
6,397,451 B1 * 6/2002 Gill ........................... G09F 7/12 40/586
2005/0039363 A1 2/2005 Galey
2007/0157496 A1 * 7/2007 Scribner ................. G09F 15/00 40/607.05

(Continued)

*Primary Examiner* — Gary C Hoge

(74) *Attorney, Agent, or Firm* — Heslin Rothenberg Farley and Mesiti P.C.

(57) ABSTRACT

A method of making signs includes printing selected visual content on a surface of material. Punch holes along at least two outer edges of the material. Orient U-stake at an x-axis of the material and thread the leg portions of the stake through the holes. Fold the material over the U-stake along the x-axis of the material, the folding dividing the material into parts, a first part and a second part, and orients the first part and the second part such that a first side of the first part adjacent to a first side of the second part, after the folding, comprise no printed visual content, and a second side of the first part and a second side of the second part comprise outer surfaces and comprise the visual content. Secure the first part to the second part.

20 Claims, 6 Drawing Sheets

(56) References Cited

U.S. PATENT DOCUMENTS

| | | | | |
|---|---|---|---|---|
| 2009/0119961 | A1* | 5/2009 | Harms | G09F 15/0025 40/607.05 |
| 2013/0067784 | A1* | 3/2013 | Parker | G09F 15/02 40/607.03 |
| 2013/0269229 | A1* | 10/2013 | Rodriguez-Aparicio, Sr. | G09F 17/00 40/607.13 |
| 2022/0343804 | A1* | 10/2022 | Harms | G09F 7/18 |
| 2022/0343805 | A1* | 10/2022 | Harms | G09F 7/18 |
| 2023/0033926 | A1* | 2/2023 | Liu | G09F 7/18 |

* cited by examiner

FIG. 3
220
226
228
221
230
240
222
241
242
225
WARNING
BEWARE
OF
DOG
WARNING
BEWARE
OF:
DOG

SIGN AND FABRICATION THEREOF

CROSS-REFERENCE TO RELATED APPLICATION

This application is a divisional application of U.S. application Ser. No. 17/542,408 filed Dec. 4, 2021, entitled "SIGN AND FABRICATION THEREOF" which claims priority from U.S. Provisional Application No. 63/121,630 filed Dec. 4, 2020, entitled, "YARD SIGN AND METHOD OF MAKING A YARD SIGN"; both these applications are herein incorporated by reference in their entireties for all purposes.

BACKGROUND

Temporary yard signs are useful for a wide variety of purposes, such as for announcing accomplishments of individuals living in the house to which the yard belongs (e.g., graduation, birthdays, etc.), political campaigning, indicating availability of property for sale or rent or open houses, announcements of yard or garage sales, and giving directions to various events or places. In the past temporary signs were formed of a single panel displaying information on only one side and attached to a sign support, such as a long wooden stake, by staples, nails, or similar fasteners. Because such signs are only intended for temporary use, it is desirable for them to be inexpensive. However, it is also desirable that such signs, when in use outdoors, remain in good enough condition that they effectively convey a desired message.

SUMMARY

Shortcomings of the prior art are overcome, and additional advantages are provided through the provision of a method of making a yard sign, comprising: obtaining a material upon which visual content can be printed by a printer, wherein the material is rectangular and comprises an x-axis dividing the material horizontally and a y-axis dividing the material vertically; printing, utilizing the printer, selected visual content on a surface of the material; utilizing a hole puncher, to punch an even number of sets of holes along at least two outer edges of the material, wherein the at least two outer edges are parallel to the y-axis and each other and wherein each hole of the even number of the sets of holes is on a same side of the x-axis of the material; orienting a U-stake at the x-axis of the material, wherein the U-stake comprises a first portion and a second portion, wherein the first portion and the second portion are parallel to each other and connected by a third portion, which is perpendicular to the first portion and the second portion, wherein the orienting comprises threading one or the first portion or the second portion of the U-stake through each hole of the even number of the sets of holes, such that a first hole of each set of holes comprises an entry point for the first portion or the second portion of the U-stake, and a second hole of each set of holes comprises an exit point for the first portion or the second portion of the U-stake, and wherein the third portion is oriented adjacent to the x-axis of the material; folding the material over the U-stake along the x-axis of the material, the folding dividing the material into parts, a first part and a second part, and orienting the first part and the second part such that a first side of the first part adjacent to a first side of the second part, after the folding, comprise no printed visual content, and a second side of the first part and a second side of the second part comprise outer surfaces and comprise the visual content, and wherein the punches holed are in either the first part or the second part of the material; and securing, using an attachment, the first part to the second part.

Shortcomings of the prior art are overcome, and additional advantages are provided through the provision of a printed sign comprising: a material printed with visual content by a printer, wherein the material is rectangular and folded along an x-axis forming a first part and a second part, wherein prior to the folding, the x-axis visually divided the material horizontally, and wherein a y-axis visually divides the material vertically; a U-stake oriented at the x-axis of the material such that the U-stake is in contact with an in inner surface of the first part and an inner surface of the second part, wherein the visual content appears on an outer surface of the first part and on an outer surface of the second part, wherein the U-stake comprises a first portion and a second portion, wherein the first portion and the second portion are parallel to each other and connected by a third portion, which is perpendicular to the first portion and the second portion, wherein the third portion is oriented adjacent to the x-axis of the material wherein one of the first part or the second part comprises an even number of sets of holes along at least two outer edges of the material, and wherein one of the first portion or the second portion of the U-stake is threaded through each hole of the even number of the sets of holes, such that a first hole of each set of holes comprises an entry point for the first portion or the second portion of the U-stake, and a second hole of each set of holes comprises an exit point for the first portion or the second portion of the U-stake, and wherein the third portion is oriented adjacent to the x-axis of the material; and a securing mechanism securing the first part to the second part.

Shortcomings of the prior art are overcome, and additional advantages are provided through the provision of a method of making a yard sign, comprising: printing selected visual content on a surface of a material, wherein the material is rectangular and comprises an x-axis dividing the material horizontally and a y-axis dividing the material vertically; punching an even number of sets of holes along at least two outer edges of the material, wherein the at least two outer edges are parallel to the y-axis and each other and wherein each hole of the even number of the sets of holes is on a same side of the x-axis of the material; threading a portion of a U-stake through each hole of the even number of the sets of holes, such that a first hole of each set of holes comprises an entry point and a second hole of each set of holes comprises an exit point for the portion, and wherein another portion of the U-stake is oriented adjacent to the x-axis of the material; folding the material over the other portion of the U-stake along the x-axis of the material, the folding dividing the material into a first part and a second part, and orienting the first part and the second part such that a first side of the first part adjacent to a first side of the second part, after the folding, comprise no printed visual content, and a second side of the first part and a second side of the second part comprise outer surfaces and comprise the visual content, and wherein the punches holed are in either the first part or the second part of the material; and securing, using an attachment, the first part to the second part.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
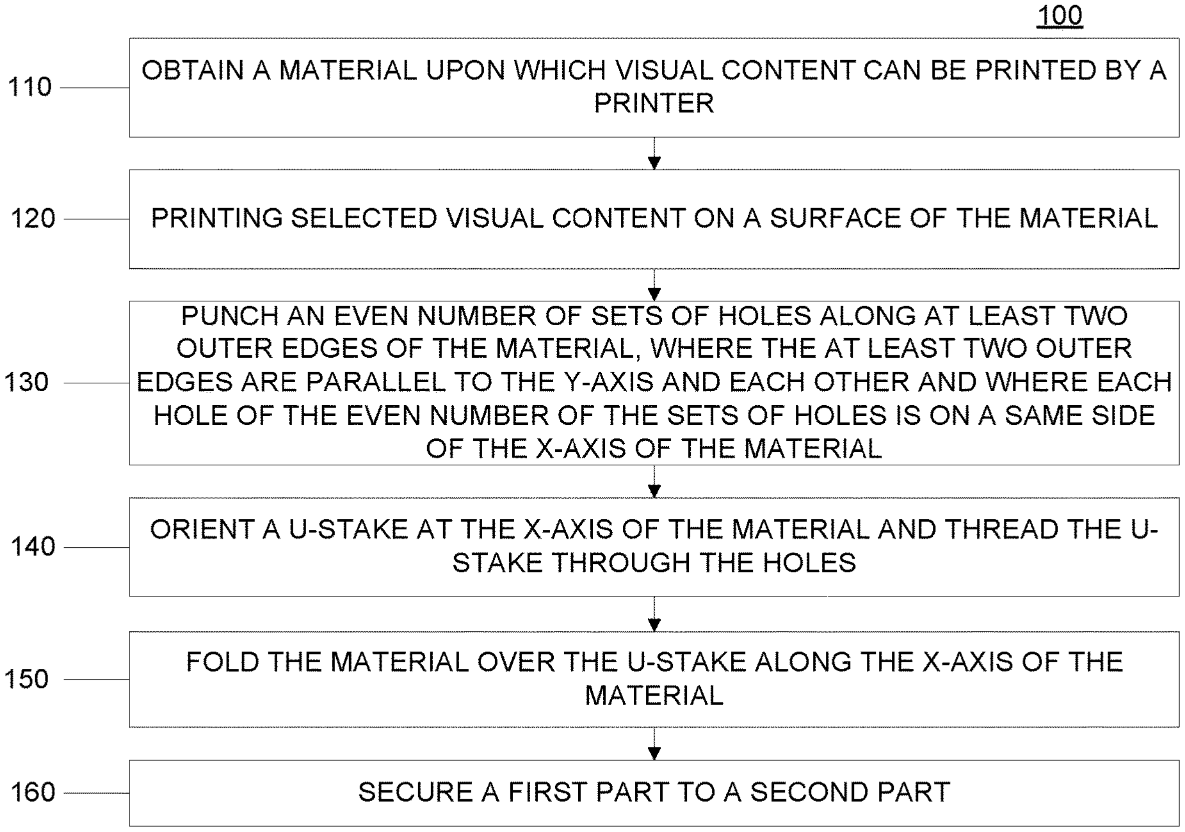
FIG. 1 depicts a workflow that includes various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Embodiments of the present invention include a yard sign and a process for manufacturing/assembling/fabricating the yard side that is efficient and inexpensive and produces a durable end-product. Existing yard signs and techniques to fabricate these yard signs are problematic because durable versions can add costs to materials and assembly. Some of the more durable yard signs require assembly by complex and expensive machinery. The yard sign product is a product that is desired by many households, but the techniques to assemble more durable versions of the product are not accessible to most consumers. Described herein is a process for manufacturing folded temporary outdoor signs which minimizes mechanical handling and processing of the sign stock, but instead, simplifies assembly to eliminate machine costs and increase accessibility of the resultant (durable) product.

The yard signs and method of fabricating them described herein provide various advantages over existing approaches and products. In the past, two-sided yard signs were durable only if created using complex machinery which is not accessible to consumers or printers. For example, these signs were often formed by scoring and folding a sheet with an image printed thereon. Then the edges of the folded sheet were sealed using an adhesive, such as a hot melt adhesive, which was applied in a line along the side edges of the folded sheet. In a more recent manufacturing process, lines of the polyethylene coating along the side edges on the inside of the folded sheet were fused using ultrasonic energy, thereby avoiding use of a separate adhesive. In another technique, two sided signs were formed by two sheets stapled together or by a single folded-over sheet with the edges joined, as by staples, or sealed by a hot melt adhesive, creating an inverted pocket to receive a sign support, such as an inverted, rectangular, U-shaped wire bail, the legs of which are inserted into the ground. The sealing of these signs adds a materials cost. To create durable signs, existing techniques also employ paper card stock coated or impregnated with a waterproof material, such as a polymer like polyethylene. Additionally, such signs are often printed using screen printing techniques and ultraviolet cured printed ink, resulting in dense ink patterns with high visibility and durability. The sealing of signs involved in existing techniques and the specialization of the materials represent costs and can slow efficiencies. Eschewing the previously discussed complex and expensive techniques, certain examples of the yard signs fabricated with the method described herein utilize the following materials: outdoor banner material, a hole punch, a stapler, and a U-stake.

FIG. 1 is a workflow 100 illustrating various aspects of some embodiments of the present invention. The workflow 100 of FIG. 1 describes a method of making a yard sign. As illustrated in FIG. 1, in some examples, the method includes obtaining a material upon which visual content can be printed by a printer (110). The visual can include images and/or text. In some examples, the material is weather resistant and can include but is not limited to vinyl and/or matte polypropylene. As illustrated in later figures, the material is rectangular and comprises an x-axis dividing the material horizontally and a y-axis dividing the material vertically. Although different sizes can be utilized in generating examples of the yard signs described herein, a non-limiting example of a size is twenty-four (24) inches (x-axis) by thirty-six (36) inches (y-axis). The visual content can be varied.

Referring to FIG. 1, the method includes printing, utilizing the printer, selected visual content on a surface of the material (120). The method includes utilizing a hole puncher, to punch an even number of sets of holes along at least two outer edges of the material (e.g., eight holes, four holes, six holes, ten holes, twelve holes, and fourteen holes), where the at least two outer edges are parallel to the y-axis and each other and where each hole of the even number of the sets of holes is on a same side of the x-axis of the material (130). Various illustrations provided herein show an eight-hole punch as an example, for illustrative purposes only.

As further illustrated in FIG. 1, the method can include orienting a U-stake at the x-axis of the material and threading the U-stake through the holes (140). The U-stake includes a first portion and a second portion, which are parallel to each other and connected by a third portion, which is perpendicular to the first portion and the second portion. This orientation includes threading one of the first portion or the second portion of the U-stake through each hole of the even number of the sets of holes, such that a first hole of each set of holes comprises an entry point for the first portion or the second portion of the U-stake, and a second hole of each set of holes comprises an exit point for the first portion or the second portion of the U-stake, and wherein the third portion is oriented adjacent to the x-axis of the material. After the orientation is complete, given section of the first portion of the U-stake and a given section the second portion of the U-stake extend beyond the material at an edge of the material parallel to the x-axis. Thus, one can plant the given section of the first portion of the U-stake and the given section of the second portion of the U-stake into a surface (e.g., a lawn). In a non-limiting example, the U-stake can be twenty-three (23) inches wide (x-axis) and thirty-two (32) inches tall (y-axis).

After the threading, the method in this example includes folding the material over the U-stake along the x-axis of the material (150). This folding divides the material into substantially equal parts, a first part and a second part, and orienting the first part and the second part such that a first side of the first part adjacent to a first side of the second part, after the folding, comprise no printed visual content, and a second side of the first part and a second side of the second part comprise outer surfaces and comprise the visual content. In one non-limiting example, the visual content is a first graphic on the first part and the second graphic on the second part. The first graphic and the second graphic can be at a 180-degree shift in orientation.

The punched holed are in either the first part or the second part of the material. The method concludes, in this examples, by securing, using an attachment, the first part to the second part (160). Examples of attachments that can be utilized include, but are not limited to, staples, tape, adhesive, and/or glue. In some examples, prior to securing the first part to the second part, one can utilize a roller to crease the material at a location of the folding and to flatten at least one of the outer surfaces.

FIGS. 2-5 illustrate various aspects of an assembly of a sign (e.g., FIG. 5, 245) using various aspects of the method illustrated by FIG. 1, illustrated at various points in the workflow 100. Consistent numberings are used throughout FIGS. 2-5 for illustrative purposes.

Figure 2:
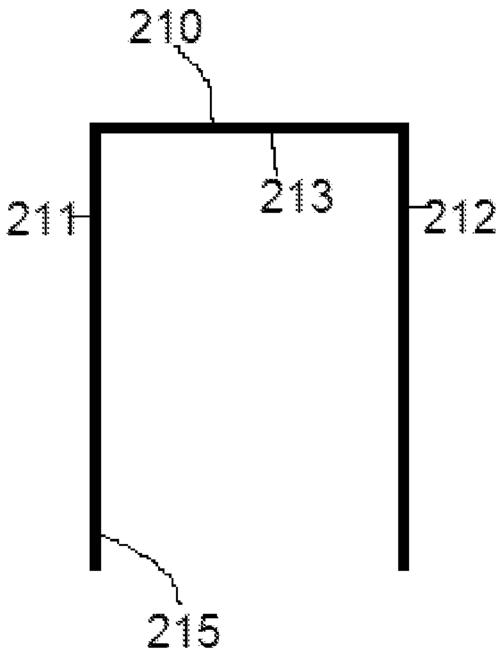
FIG. 2 depicts various aspects of some embodiments of the present invention.

FIG. 2 depicts a (metal) U-stake 210 as an initial stage 215 of an assembly process. There U-stake 210 is contiguous but is comprised of a first portion 211 and a second portion 212, which are parallel to each other, and a third portion 213, which is perpendicular to both and connects the first portion 211 and the second portion 212.

Figure 3:
FIG. 3 depicts various aspects of some embodiments of the present invention.
Figure 5:
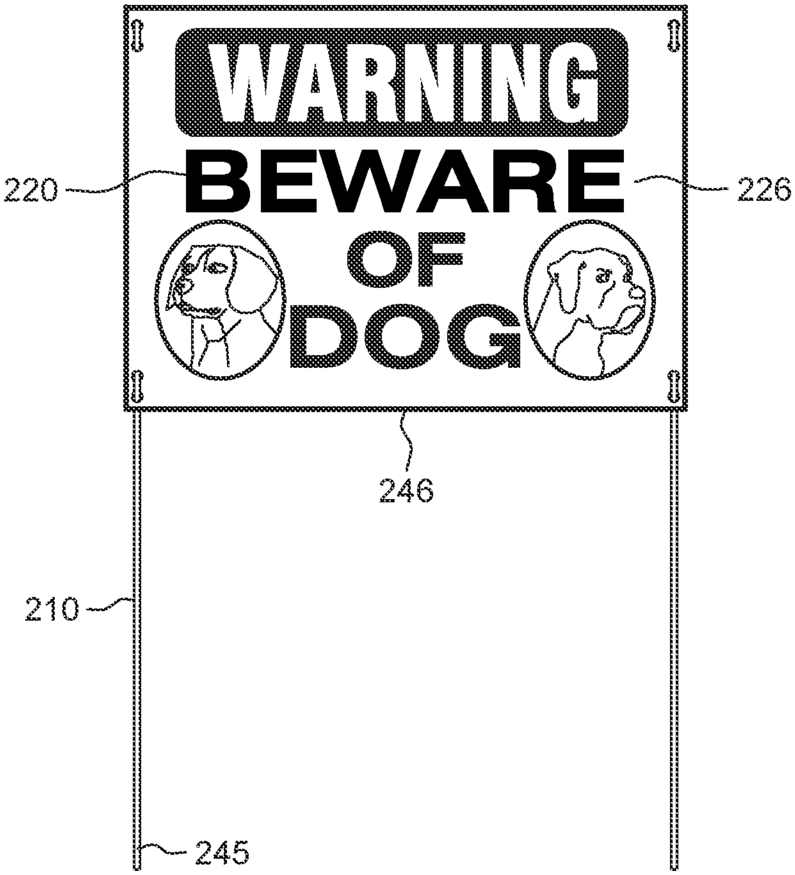
FIG. 5 depicts various aspects of some embodiments of the present invention.

FIG. 3 illustrates the printed material 220, which will be adjoined to the U-stake 210 to form the final sign (see, FIG. 5, 245). In some examples, the material 220 of the sign (or banner) is a matte polypropylene outdoor banner material, including but not limited to, any material that meets the waterproofing requirements and can be printed upon. A design 226 is printed on one side of the material 226 while the other side of the material 227 is not printed (as this side will not be visible once the sign is assembled). In this example, the material 220 is rectangular (e.g., twenty-four by thirty-six inches, but different measurements can be used includes those utilized with many existing printers at retail locations). The material includes 220 holes 240 punched in it on two sides, and a fold line 230. These holes 240 can be punched, manually, with a standard hole puncher (e.g., hand punch and/or desktop paper punch). Also, as part of printing the design on the material 220, the printing can include marking the material 220 with visual guides for manually punching the holes. Thus, the print on the material can include printed hole punch marks on one half of the print (e.g., first part 221 or second part 222) for the associate for assembly. In some examples, such as that in FIG. 3, the printed material 220 includes content at the first part 221 and the second part 222 which are at a 180-degree shift in orientation from each other.

Figure 4:
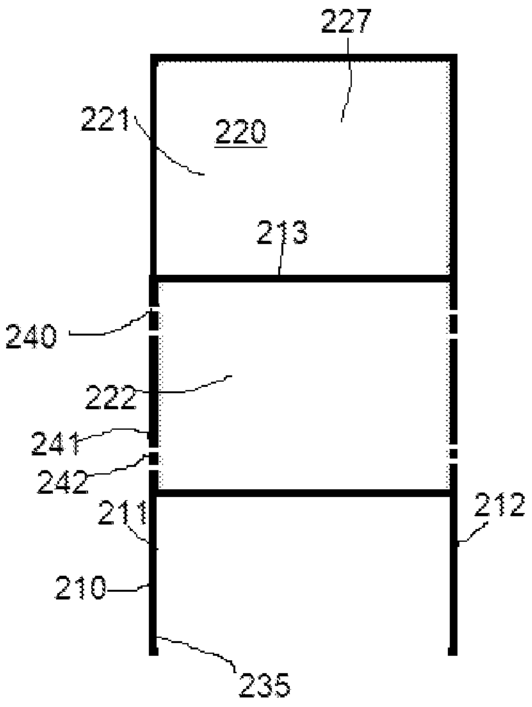
FIG. 4 depicts various aspects of some embodiments of the present invention.

Referring to FIGS. 3 and 4, the material 220 in the final sign 245 is folded along the fold line 230. The fold line 230 is along an x-axis. Folding the sign along the fold line 230 divides the sign into a first part 221 and a second part 222. In one example, the sign is creased before it is folded and as a result, the material 220, which was 24×36, forms a two-sided sign with each side being 24×18. As illustrated in FIG. 3, prior to the folding, the x-axis visually divided the material horizontally (a y-axis visually divides the material vertically). As seen in FIG. 5, once it is folded, the design 226 is visible.

Referring to FIGS. 3 and 4, to assemble the final sign 245, the U-stake 210 is oriented at the fold line 230, an x-axis of the material, such that the U-stake 210 is in contact with an in inner surface 227 of the first part 221 and an inner surface 227 of the second part 222. As discussed above, visual content (design 226) appears on the outer surfaces of the first part 221 and the second part 222. The U-stake 210 is placed at the fold line 230. The U-stake 210 can be thought of as having three parts that form the "U" from which it takes its name. There is a first portion 211 and a second portion 212, which are parallel to each other, and a third portion 213, which is perpendicular to both and connects the first portion 211 and the second portion 212. It is the third portion 213 that is placed at the fold line 230 of the material 220. Specifically, the third portion 213 is oriented adjacent to the x-axis (fold line 230) of the material 220. The edges of the material 220 are aligned when the material 220 is folded over the U-stake 210 at the fold line 230.

As illustrated in both FIGS. 3 and 4, either the first part 221 or the second part 222 of the material 220 includes an even number of sets of holes 240 along at least two outer edges of the material 220. In FIG. 3, there are eight holes in sets of four along two parallel edges of the second part 222 of the material 220. The first portion 211 and the second portion 212 of the U-stake 210 are threaded through the holes 240. The stage of the process 235 with the positioning of the material 220 post-threading is illustrated in FIG. 5. As illustrated in FIGS. 3 and 4, each set of holes 240 includes a first hole 241, which is an entry point for the U-stake 210, and a second hole 242, which is an exit point for U-stake. In some examples, the weaving of the stake part through the sign looks like the threading of shoelaces.

Figure 6:
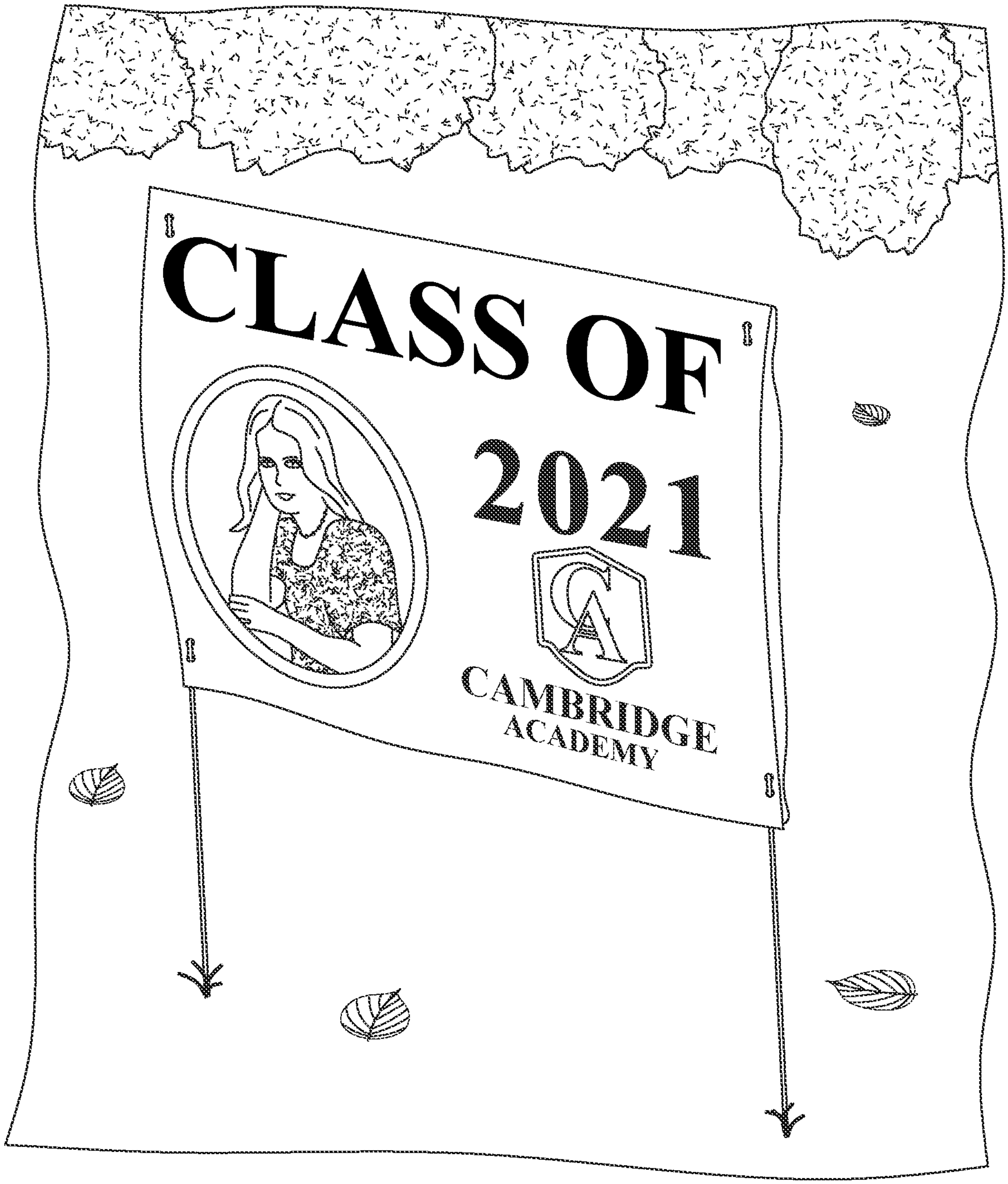
FIG. 6 depicts various aspects of some embodiments of the present invention.

Referring to FIG. 5, the completed sign 245 is the result of folding the first portion 221 over the fold line 230 (and the U-stake 210) and securing the first portion 221 to the second portion 222. The sign 245 can be secured with one or more of staples, tape, adhesive, and glue, for example. In one example, 2-3 staples are used as a fastener along the bottom edge 246 of the sign 245. FIG. 6 also provides an example of a completed sign, this shown having been staked in the ground using the U-stake.

Embodiments of the present invention include signs and method of making signs. Some examples of the method include obtaining a material upon which visual content can be printed by a printer, where the material is rectangular and comprises, an x-axis dividing the material horizontally and a y-axis dividing the material vertically. The method also includes printing, utilizing the printer, selected visual content on a surface of the material. The method includes utilizing a hole puncher, to punch an even number of sets of holes along at least two outer edges of the material, where the at least two outer edges are parallel to the y-axis and each other and where each hole of the even number of the sets of holes is on a same side of the x-axis of the material. The method includes orienting a U-stake at the x-axis of the material, where the U-stake comprises a first portion and a second portion, where the first portion and the second portion are parallel to each other and connected by a third portion, which is perpendicular to the first portion and the second portion, where the orienting comprises threading one or the first portion or the second portion of the U-stake through each hole of the even number of the sets of holes, such that a first hole of each set of holes comprises an entry point for the first portion or the second portion of the U-stake, and a second hole of each set of holes comprises an exit point for the first portion or the second portion of the U-stake, and where the third portion is oriented adjacent to the x-axis of the material. The method includes folding the material over the U-stake along the x-axis of the material, the folding dividing the material into parts, a first part and a second part, and orienting the first part and the second part such that a first side of the first part adjacent to a first side of the second part, after the folding, comprise no printed visual content, and a second side of the first part and a second side of the second part comprise outer surfaces and comprise the visual content, and where the punches holed are in either the first part or the second part of the material. The method includes securing, using an attachment, the first part to the second part.

In some examples of this method, the material comprises a weather resistant material.

In some examples of this method, the even number of holes is selected from the group consisting of: eight holes, four holes, six holes, ten holes, twelve holes, and fourteen holes.

In some examples of this method, the attachment is selected from the group consisting of: one or more staples, tape, adhesive, and glue.

In some examples of this method, the x-axis measures twenty-four (24) inches.

In some examples of this method, the y-axis measures thirty-six (36) inches.

In some examples of this method, based on the orienting, a given section of the first portion of the U-stake and a given section the second portion of the U-stake extend beyond the material at an edge of the material parallel to the x-axis. In these examples, the method can also include planting the given section of the first portion of the U-stake and the given section of the second portion of the U-stake into a surface.

In some examples of this method, the method can also include securing, utilizing a roller to crease the material at a location of the folding and to flatten at least one of the outer surfaces.

In some examples of this method, the visual content comprises a first graphic on the first part and the second graphic on the second part.

In some examples of this method, the first graphic is the second graphic at a 180-degree shift in orientation.

In some examples of this method, the visual content comprises at least one of: one or more images or text.

In some examples of this method, the hole puncher comprises a hand punch or a desktop hold punch.

In some examples, the sign includes a material printed with visual content by a printer, wherein the material is rectangular and folded along an x-axis forming a first part and a second part, wherein prior to the folding, the x-axis visually divided the material horizontally, and wherein a y-axis visually divides the material vertically. The sign can also include a U-stake oriented at the x-axis of the material such that the U-stake is in contact with an in inner surface of the first part and an inner surface of the second part, wherein the visual content appears on an outer surface of the first part and on an outer surface of the second part, wherein the U-stake comprises a first portion and a second portion, wherein the first portion and the second portion are parallel to each other and connected by a third portion, which is perpendicular to the first portion and the second portion, wherein the third portion is oriented adjacent to the x-axis of the material wherein one of the first part or the second part comprises an even number of sets of holes along at least two outer edges of the material, and wherein one of the first portion or the second portion of the U-stake is threaded through each hole of the even number of the sets of holes, such that a first hole of each set of holes comprises an entry point for the first portion or the second portion of the U-stake, and a second hole of each set of holes comprises an exit point for the first portion or the second portion of the U-stake, and wherein the third portion is oriented adjacent to the x-axis of the material. The sign can include a securing mechanism securing the first part to the second part.

In some examples of the sign, the material is selected from the group consisting of vinyl and matte polypropylene.

In some examples of the sign, the x-axis of the material measures twenty-four (24) inches and the y-axis of the material measures thirty-six (36) inches.

In some examples of the sign, the material comprises a weather resistant material.

In some examples of the sign, the first part has a first perimeter and the second part had a second perimeter and the first perimeter and the second perimeter are substantially equal.

In some examples of the sign, the even number of holes is selected from the group consisting of: eight holes, four holes, six holes, ten holes, twelve holes, and fourteen holes.

In some examples of the sign, the securing mechanism is selected from the group consisting of: one or more staples, tape, adhesive, and glue.

Some examples of the method include printing selected visual content on a surface of a material, wherein the material is rectangular and comprises an x-axis dividing the material horizontally and a y-axis dividing the material vertically. The method can also include punching an even number of sets of holes along at least two outer edges of the material, wherein the at least two outer edges are parallel to the y-axis and each other and wherein each hole of the even number of the sets of holes is on a same side of the x-axis of the material. The method can also include threading a portion of a U-stake through each hole of the even number of the sets of holes, such that a first hole of each set of holes comprises an entry point and a second hole of each set of holes comprises an exit point for the portion, and wherein another portion of the U-stake is oriented adjacent to the x-axis of the material. The method can also include folding the material over the other portion of the U-stake along the x-axis of the material, the folding dividing the material into a first part and a second part, and orienting the first part and the second part such that a first side of the first part adjacent to a first side of the second part, after the folding, comprise no printed visual content, and a second side of the first part and a second side of the second part comprise outer surfaces and comprise the visual content, and wherein the punches holed are in either the first part or the second part of the material. The method can also include securing, using an attachment, the first part to the second part.

The flowchart and block diagrams in the Figures illustrate the method according to various embodiments of the present invention. In some alternative implementations, the functions noted in the blocks may occur out of the order noted in the Figures. For example, two blocks shown in succession may, in fact, be executed substantially concurrently, or the blocks may sometimes be executed in the reverse order, depending upon the steps involved.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of making a yard sign, comprising:

obtaining a material upon which visual content can be printed by a printer, wherein the material is rectangular and comprises an x-axis dividing the material horizontally and a y-axis dividing the material vertically;

printing, utilizing the printer, selected visual content on a surface of the material;

utilizing a hole puncher, to punch an even number of sets of holes along at least two outer edges of the material, wherein the at least two outer edges are parallel to the y-axis and each other and wherein each hole of the even number of the sets of holes is on a same side of the x-axis of the material;

orienting a U-stake at the x-axis of the material, wherein the U-stake comprises a first portion and a second portion, wherein the first portion and the second portion are parallel to each other and connected by a third portion, which is perpendicular to the first portion and the second portion, wherein the orienting comprises threading one or the first portion or the second portion of the U-stake through each hole of the even number of the sets of holes, such that a first hole of each set of holes comprises an entry point for the first portion or the second portion of the U-stake, and a second hole of each set of holes comprises an exit point for the first portion or the second portion of the U-stake, and wherein the third portion is oriented adjacent to the x-axis of the material;

folding the material over the U-stake along the x-axis of the material, the folding dividing the material into parts, a first part and a second part, and orienting the first part and the second part such that a first side of the first part adjacent to a first side of the second part, after the folding, comprise no printed visual content, and a second side of the first part and a second side of the second part comprise outer surfaces and comprise the visual content, and wherein the punches holed are in either the first part or the second part of the material; and securing, using an attachment, the first part to the second part.

2. The method of claim 1, wherein the material comprises a weather resistant material.

3. The method of claim 1, wherein the even number of holes is selected from the group consisting of: eight holes, four holes, six holes, ten holes, twelve holes, and fourteen holes.

4. The method of claim 1, wherein the attachment is selected from the group consisting of: one or more staples, tape, adhesive, and glue.

5. The method of claim 1, wherein the x-axis measures twenty-four (24) inches.

6. The method of claim 1, wherein the y-axis measures thirty-six (36) inches.

7. The method of claim 1, wherein based on the orienting, a given section of the first portion of the U-stake and a given section the second portion of the U-stake extend beyond the material at an edge of the material parallel to the x-axis, the method further comprising:

planting the given section of the first portion of the U-stake and the given section of the second portion of the U-stake into a surface.

8. The method of claim 1, further comprising:

prior to securing, utilizing a roller to crease the material at a location of the folding and to flatten at least one of the outer surfaces.

9. The method of claim 1, wherein the visual content comprises a first graphic on the first part and the second graphic on the second part.

10. The method of claim 9, wherein the first graphic is the second graphic at a 180-degree shift in orientation.

11. The method of claim 1, wherein the visual content comprises at least one of: one or more images or text.

12. The method of claim 1, wherein the hole puncher comprises a hand punch or a desktop hold punch.

13. A method of making a sign, comprising:

printing selected visual content on a surface of a material, wherein the material is rectangular and comprises an x-axis dividing the material horizontally and a y-axis dividing the material vertically;

punching an even number of sets of holes along at least two outer edges of the material, wherein the at least two outer edges are parallel to the y-axis and each other and wherein each hole of the even number of the sets of holes is on a same side of the x-axis of the material;

threading a portion of a U-stake through each hole of the even number of the sets of holes, such that a first hole of each set of holes comprises an entry point and a second hole of each set of holes comprises an exit point for the portion, and wherein another portion of the U-stake is oriented adjacent to the x-axis of the material;

folding the material over the other portion of the U-stake along the x-axis of the material, the folding dividing the material into a first part and a second part, and orienting the first part and the second part such that a first side of the first part adjacent to a first side of the second part, after the folding, comprise no printed visual content, and a second side of the first part and a second side of the second part comprise outer surfaces and comprise the visual content, and wherein the punches holed are in either the first part or the second part of the material; and securing, using an attachment, the first part to the second part.

14. The method of claim 13, wherein the material comprises a weather resistant material.

15. The method of claim 13, wherein the even number of holes is selected from the group consisting of: eight holes, four holes, six holes, ten holes, twelve holes, and fourteen holes.

16. The method of claim 13, wherein the attachment is selected from the group consisting of: one or more staples, tape, adhesive, and glue.

17. A method of making a sign, comprising:

printing selected visual content on a surface of a material, wherein the material is rectangular and comprises an x-axis dividing the material horizontally and a y-axis dividing the material vertically;

punching an even number of sets of holes along at least two outer edges of the material, wherein the at least two outer edges are parallel to the y-axis and each other and wherein each hole of the even number of the sets of holes is on a same side of the x-axis of the material;

threading a portion of a U-stake through each hole of the even number of the sets of holes, such that a first hole of each set of holes comprises an entry point and a second hole of each set of holes comprises an exit point for the portion, and wherein another portion of the U-stake is oriented adjacent to the x-axis of the material;

folding the material over the other portion of the U-stake along the x-axis of the material, the folding dividing the material into a first part and a second part, and orienting the first part and the second part such that a first side of the first part adjacent to a first side of the second part, after the folding, comprise no printed visual content, and a second side of the first part and a second side of the second part comprise outer surfaces and comprise the visual content, wherein the punches holed are in either the first part or the second part of the material, and wherein a portion of the U-stake is visible from one of the outer surface of the first part or the outer surface of the second part; and securing, using an attachment, the first part to the second part.

18. The method of claim 17, wherein the material comprises a weather resistant material.

19. The method of claim 17, wherein the even number of holes is selected from the group consisting of: eight holes, four holes, six holes, ten holes, twelve holes, and fourteen holes.

20. The method of claim 17, wherein the attachment is selected from the group consisting of: one or more staples, tape, adhesive, and glue.

* * * * *